United States Patent
Huang et al.

(10) Patent No.: US 9,319,258 B2
(45) Date of Patent: Apr. 19, 2016

(54) SYSTEMS, METHODS, AND DEVICES FOR IDENTIFYING WI-FI SIGNALS FOR SPATIAL REUSE

(71) Applicant: INTEL CORPORATION, Santa Clara, CA (US)

(72) Inventors: Po-Kai Huang, Santa Clara, CA (US); Robert Stacey, Portland, OR (US); Rongzhen Yang, Shanghai (CN); Qinghua Li, San Ramon, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/528,673

(22) Filed: Oct. 30, 2014

(65) Prior Publication Data

US 2016/0087826 A1  Mar. 24, 2016

Related U.S. Application Data

(60) Provisional application No. 62/053,008, filed on Sep. 19, 2014.

(51) Int. Cl.
*H03K 9/00* (2006.01)
*H04L 27/26* (2006.01)
(Continued)

(52) U.S. Cl.
CPC .......... *H04L 27/2605* (2013.01); *H04L 1/1832* (2013.01); *H04L 27/2614* (2013.01); *H04W 84/12* (2013.01)

(58) Field of Classification Search
CPC . H04L 27/2601; H04L 27/26; H04L 27/2678; H04L 27/2614; H04W 84/12; H04W 74/0816; H04B 1/719; H04B 7/0452; H04B 7/0413
USPC .................. 370/431–463, 469–501; 455/500, 455/101–103; 375/134, 137, 141–143, 150, 375/152, 260, 267, 343, 347, 349
See application file for complete search history.

(56) References Cited

U.S. PATENT DOCUMENTS

| 8,411,807 B1* | 4/2013 | Rangarajan ............. H04L 69/22 375/316 |
| 2006/0114981 A1* | 6/2006 | Ghosh ...................... H04L 1/20 375/232 |

(Continued)

FOREIGN PATENT DOCUMENTS

KR       10-0596500       7/2006

OTHER PUBLICATIONS

Bin Zhen et al., "Clear channel assessment in integrated medical environments", EURASIP Journal on Wireless communications and Networking—Wireless Telemedicine and Applications, Jan. 1, 2008. http://dl.acm.org/citation.cfm?id=1387817. See section 3.

(Continued)

*Primary Examiner* — Rahel Guarino
(74) *Attorney, Agent, or Firm* — Sutherland Asbill & Brennan LLP

(57) ABSTRACT

Example systems, methods, and devices for differentiating Wi-Fi signals for spatial reuse are discussed. More specifically, a communication station arranged for Clear Channel Assessment (CCA) channel status reporting, an access point, and communication methodologies therebetween are disclosed. Methods, apparatus, and systems described herein can be applied to 802.11ax or any other wireless standard.

23 Claims, 9 Drawing Sheets

(51) Int. Cl.
*H04L 1/18* (2006.01)
*H04W 84/12* (2009.01)

(56) References Cited

U.S. PATENT DOCUMENTS

| | | |
|---|---|---|
| 2008/0123517 A1 | 5/2008 | Kim et al. |
| 2009/0132675 A1 | 5/2009 | Horn et al. |
| 2014/0098912 A1 | 4/2014 | Yin et al. |
| 2014/0194062 A1* | 7/2014 | Palin ............ H04W 4/008 455/41.2 |
| 2015/0049680 A1* | 2/2015 | Jeffery .......... H04W 74/0816 370/329 |
| 2015/0110058 A1* | 4/2015 | Shapira ............ H04B 1/3805 370/329 |
| 2015/0124792 A1* | 5/2015 | Gix ................ H04W 48/16 370/338 |
| 2015/0223244 A1* | 8/2015 | Tabet ............. H04W 72/0453 370/329 |

OTHER PUBLICATIONS

International Search Report and Written Opinion for PCT Application PCT/US2015/047500 mailed Dec. 8, 2015.

* cited by examiner

| | Mean Throughput (Mbps) | 5th Percentile Throughput (Mbps) | 95th Percentile Throughput (Mbps) |
|---|---|---|---|
| New threshold set to -72dBm for identifying Wi-Fi signal(s) | 2.1133 | 0.0339 | 7.8466 |
| Energy detection level set to -62dBm | 1.8190 | 0.0069 | 7.3638 |

FIG. 5

SYSTEMS, METHODS, AND DEVICES FOR IDENTIFYING WI-FI SIGNALS FOR SPATIAL REUSE

CROSS REFERENCE TO RELATED APPLICATION

This application claims the benefit of U.S. provisional Patent Application Ser. No. 62/053,008, filed on Sep. 19, 2014, the disclosure of which is incorporated herein by reference.

TECHNICAL FIELD

Example embodiments disclosed generally relate to wireless networks.

BACKGROUND

A next generation WLAN, IEEE 802.11ax or High-Efficiency WLAN (HEW), is under development. Uplink multiuser MIMO (UL MU-MIMO) and Orthogonal Frequency-Division Multiple Access (OFDMA) are two major features included in the new standard. For both features, however, the Access Point (AP) needs to schedule the transmissions or receptions of multiple users. This requires the AP to have channel status knowledge comprising Clear Channel Assessment (CCA) and buffer status of the user communication stations (STAs).

BRIEF DESCRIPTION OF THE DRAWINGS

FIG. 5 illustrates throughput results of an example simulation setting for a IEEE 802.11ax network, according to one or more example embodiments;

DETAILED DESCRIPTION

Figure 1:
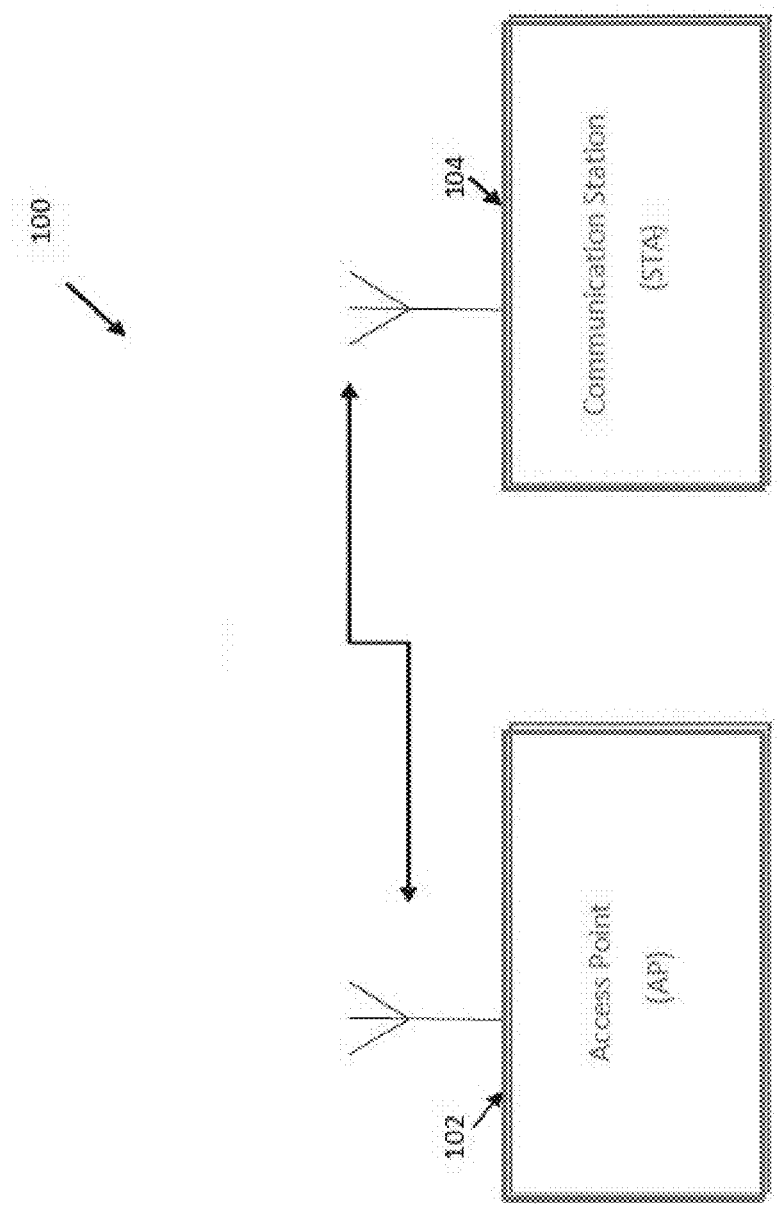
FIG. 1 is a network diagram illustrating an example network environment, according to one or more example embodiments.

Embodiments of the disclosure relate to systems, method, and devices for differentiating Wi-Fi signals for spatial reuse.

Wi-Fi transmissions are typically asynchronous. The receiver typically relies on the preamble to detect the start of a packet, determine the packet duration, decode desired transmission, and defer for undesired transmission. In Wi-Fi standards, for example, IEEE 802.11-2012, typically a specification specifies if the signal strength of a Wi-Fi transmission is above a signal detect (SD) threshold, for example, −82 dBm for a 20 MHz channel, so the receiver can start to detect the signal. Further, if the signal (SIG) field of the preamble is correct, then the receiver can choose to defer for the entire transmission duration or decode the entire packet. However, if the signal (SIG) field of the preamble has errors, the receiver may use an energy detection (ED) level of, for example, −62 dBm for a 20 MHz channel, to determine if the signal medium is busy.

Ideally, the receiver may be able to identify the Wi-Fi transmissions to defer for the existing transmissions or should be able to transmit to achieve spatial reuse. However, in a dense environment, there may be many overlapping basic service set (OBSS) transmissions. Hence, it is possible for the preamble to have errors, and Wi-Fi devices may not be able to identify the existing transmissions and may have to use higher energy detection levels like −62 dBm to sense the spectrum and avoid non-Wi-Fi transmissions. This could make it hard to achieve spatial reuse, however.

Furthermore, the throughput of the legacy network also suffers because the high interference level due to the frequent usage of −62 dBm energy detection. This degradation gets even worse as the density or overlapping of the cells, for example, in the basic service sets (BSSs), increases.

Accordingly, it is important to reduce the chance of using −62 dBm energy detection level. Since Wi-Fi operates in unlicensed bands, non-Wi-Fi devices, for example, a microwave or a cordless phone can occupy the same band without MAC coordination, and in such a case, a high threshold like −62 dBm may be beneficial. Therefore, one cannot simply lower the energy detection threshold from −62 dBm to −82 dBm because it results in a 20% throughput gain in pure Wi-Fi network by doing so.

Details of one or more implementations are set forth in the accompanying drawings and in the description below. Further embodiments, features, and aspects will become apparent from the description, the drawings, and the claims.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station or another mobile station. An access point may also be referred to as an access node, a base station or some other similar terminology known in the art. An access point may also be called a mobile station, a user equipment (UE), a wireless communication device or some other similar terminology known in the art. Both communication station and the access point may simply be referred to as a device in the present disclosure. Embodiments disclosed herein generally pertain to wireless networks. Some embodiments can relate to wireless networks that operate in accordance with one of the IEEE 802.11 standards including the IEEE 802.1 lax standard.

FIG. 1 is a network diagram illustrating an example network environment suitable for FTM Burst Management, according to some example embodiments. Wireless network 100 can include one or more communication stations (STAs) 104 and one or more access points (APs) 102, which may communicate in accordance with IEEE 802.11 communication techniques. The communication stations 104 may be mobile devices that are non-stationary and do not have fixed locations. The one or more APs may be stationary and have fixed locations. The stations may include an AP communication station (AP) 102 and one or more responding communication stations STAs 104.

In accordance with some IEEE 802.11ax (High-Efficiency Wi-Fi (HEW)) embodiments, an access point may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

Although Downlink Multiuser MIMO (DL MU-MIMO) was introduced to Wi-Fi in 802.11ac, features to prevent reception jamming caused by incorrect channel status assumptions were not addressed. There is no channel reservation scheme for DL MU-MIMO reception in existing Wi-Fi. Additionally, there is no polling scheme known in Wi-Fi for multiuser scheduling. Without protecting the receiver and polling the receiver, the system throughput can be lower than that with the protection/poll by 2× and more for long packets.

In certain of these scenarios, the access point (AP) sees an idle channel and directly sends downlink MU-MIMO data to the scheduled stations (STA) without checking the channel statuses of the STAs. Reception of the DL MU-MIMO data is properly received only if the channel statuses of the access point (AP) and the receive station (STA) are identical. If the AP sees an idle channel but the scheduled communication station STA 104 does not, the downlink reception at the communication station STA 104 is subject to interference, similar to interference resulting from transmitting a data packet without RTS/CTS protection in legacy Wi-Fi. Transmission of short packets may not result in interference. However, for long packets such as the aggregated packets having 3-4 micro-seconds (ms) transmission durations, the throughput without the RTS/CTS protection is much lower than that with the RTS/CTS protection.

OFDMA is another feature of 802.11ax. OFDMA can experience reception jamming if the AP 102 does not know the CCA status of the communication station STA 104 or the STA does not reserve the channel for receiving long packets. Certain methods and apparatus for improving efficiency in DL MU-MIMO, DL OFDMA, and UL MU-MIMO of 802.11ax HEW are detailed in FIGS. 3-7.

The example systems, methods, and devices disclosed herein use novel and inventive mechanisms to identify Wi-Fi transmission without the need for preamble detection so that the spatial reuse can be achieved with more than 20% throughput improvement, for example. In other words, high spatial reuse can be achieved with more than 20% throughput environment.

According to one example embodiment, the systems, methods, and devices described may enable the detection of Wi-Fi signal in the absence of a Wi-Fi preamble such that a threshold lower than −62 dBm, for example, −82 dBm may be in used in an OBSS. According to one example embodiment, the systems, methods, and devices described may detect the repetition of cyclic prefixes (CP) at the beginning and end of each orthogonal frequency division multiplexing (OFDM) symbol. According to another example embodiment, the systems, methods, and devices described may detect the pilot signal at the pilot tones of Wi-Fi. According to another example embodiment, the systems, methods, and devices may detect the OFDM subcarrier structure of Wi-Fi whose signal energy concentrates on the evenly spaced frequency points with known subcarrier spacing, DC subcarrier null, and guard band edges. Orthogonal Frequency-Division Multiple Access (OFDMA) is a multi-user version of the popular orthogonal frequency-division multiplexing (OFDM) digital modulation scheme. Multiple access is achieved in OFDMA by assigning subsets of subcarriers to individual users, for example, which allows simultaneous low data rate transmission from several users, for example.

Figure 2:
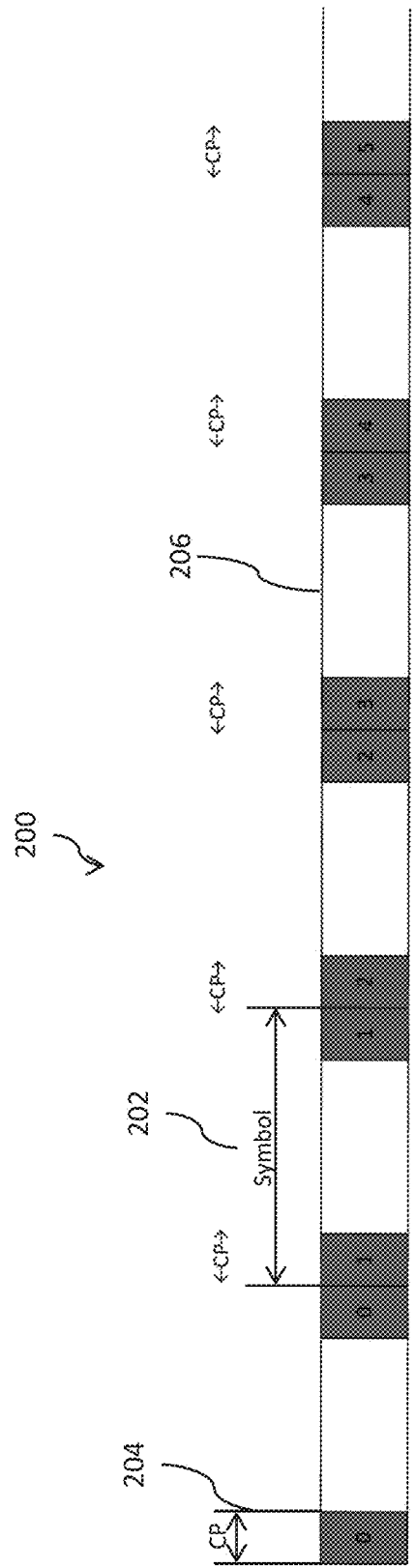
FIG. 2 illustrates symbols in a time domain for a Wi-Fi transmission, according to one or more example embodiments.

Wi-Fi transmissions in general use OFDM technology and have repetition patterns due to a CP. For example, FIG. 2 shows a plurality of transmitted symbols 202 in a time domain for a Wi-Fi transmission 200. As shown in FIG. 2, each OFDM symbol 202 can include two CPs 204, one at the beginning of each symbol 202 and one at the end of the symbol. The two CPs 204 may be separated by the data 206 contained in the symbol 202, for example. In a Wi-Fi transmission, for example, a symbol duration 'L' may be 4 μsec, for example. The length of the CP 'C' may be 0.8 μsec, for example. However, it should be noted that 'L' can be 3.6 μsec with a 'C' of 0.4 μsec, for example, for legacy 802.11a/n/ac standards, and 'L' could be 16 µsec with a 'C' of 1.6 µsec for future 802.11ax standards. The example embodiments described herein are however not limited to these values and may be applied to Wi-Fi transmissions of any length.

Figure 3:
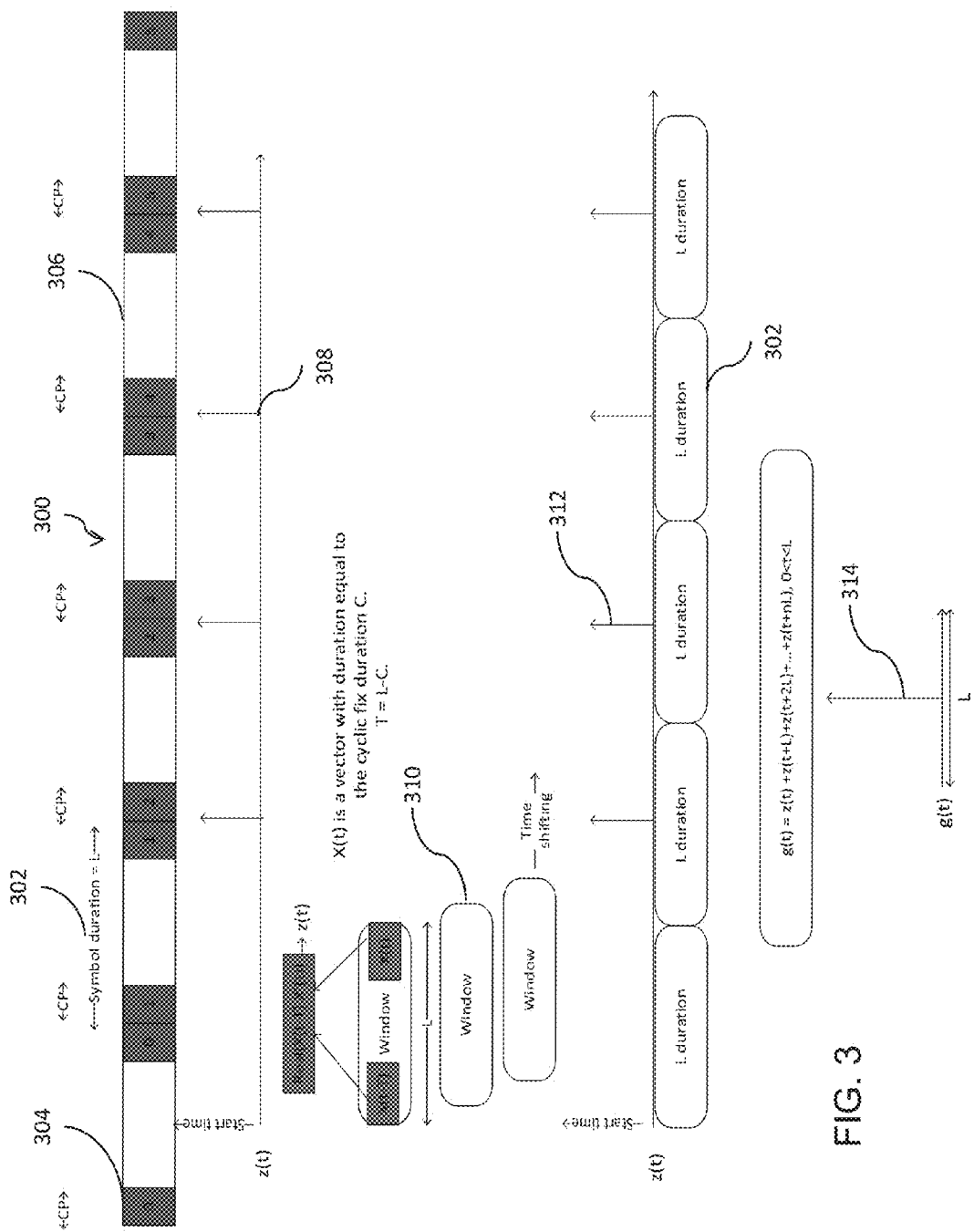
FIG. 3 illustrates an example of sequence of operations in a time domain for a Wi-Fi transmission, according to one or more example embodiments.

Turning now to FIG. 3, in one example embodiment, the systems, methods, and devices described may use a CP 304 with a length 'C' of 0.8 µsec, for example. Wi-Fi transmission 300 may include a plurality of symbols 302 with symbol duration 'L' including data 306 that may be sandwiched between the two CPs 304. Since the CP 304 has two copies per symbol 302, one copy at the beginning or end may be used as the matched filter to match against the copy. Since the two copies 304 are 3.2 µsec apart in time, a sliding window 310 may be used with 0.8 µsec samples coming in 3.2 µsec later or earlier. The matched filter output can deliver a plurality of peaks 308 when the sliding window 310 and CP 304 coincide. Since the CP 304 duration is only one fourth of the symbol 302 duration and it may be corrupted by multiple paths, the energy collected by the matched filter and its reliability may be limited. For enhancement, multiple peaks 312 of the matched filter output, which may be 4 µsec apart, may be combined to produce a larger peak 314 that may be easily identifiable. A high level example is shown in FIG. 3, where a Wi-Fi device identifies a Wi-Fi transmission using a larger peak 314, for example.

Figure 4:
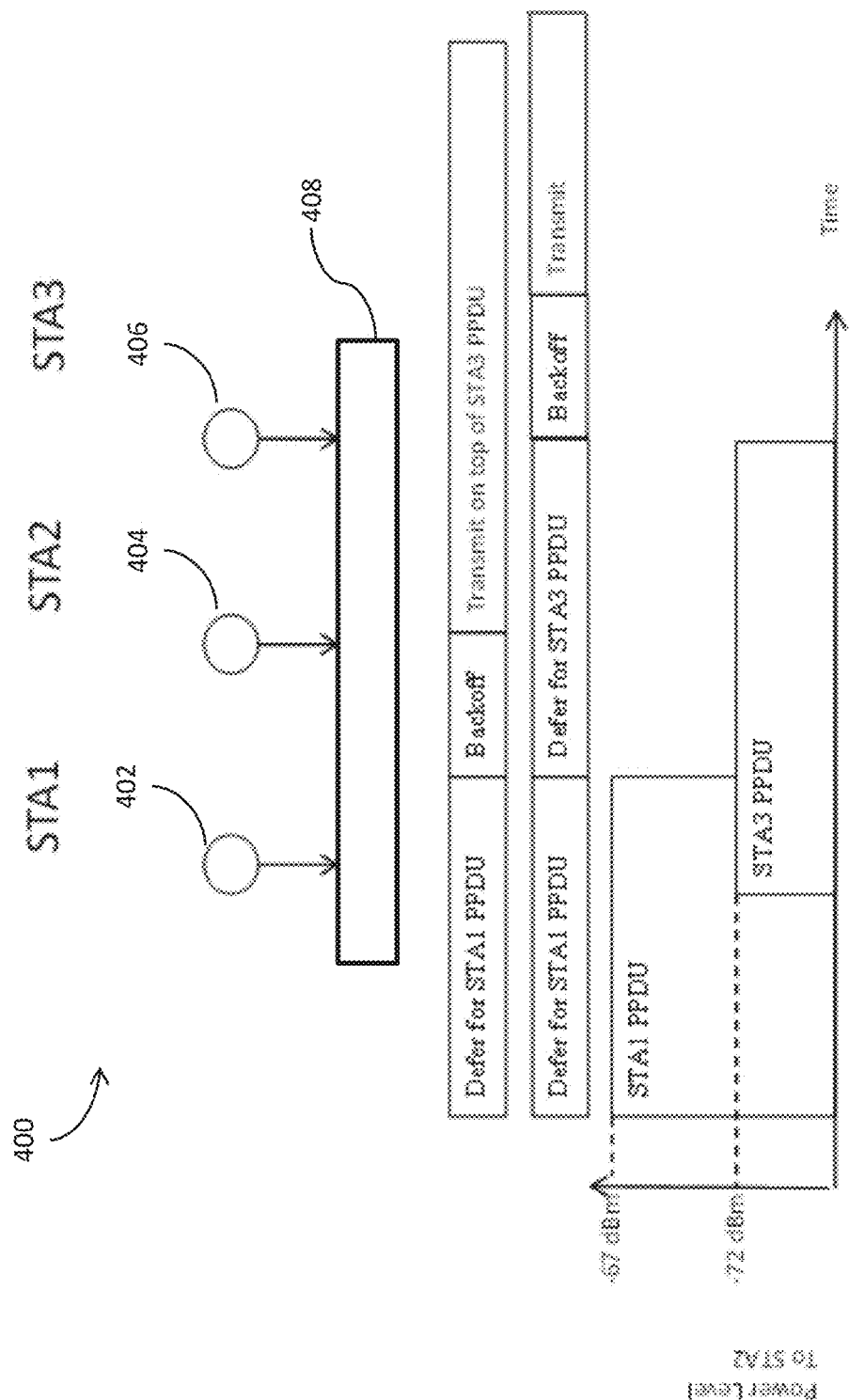
FIG. 4 illustrates an example of sequence of operations in a time domain for a Wi-Fi transmission, according to one or more example embodiments.

Illustrated in FIG. 4 is a communication method, according to one or more example embodiments of the present disclosure. Example Wi-Fi network 400 may include one or more communication stations (STA), for example, STA1 (402), STA2 (404), and STA3 (406) which may communicate with base station or access point 408. Within the OBSS 400, devices 402, 404, and 406 may not be able to sense each other. For example, if STA 1 and STA3 cannot sense each other, and STA1 has a higher power level than STA2 and STA3, then when STA1 first transmits, STA2 can be able to detect the preamble and defer for the Wi-Fi transmissions. Then STA3 may also transmit because it cannot sense the transmissions of STA1. However, for STA2, the preamble of STA3 may have errors, and STA3 may use an energy detect (ED) level of −62 dBm to sense the medium and may not be able to defer the transmission of STA3 physical layer protocol data unit (PPDU) at the end of STA1 PPDU transmissions, as shown at the bottom of FIG. 4, for example.

According to one example embodiment, STA2 may still be able to discover STA3 PPDU transmissions and defer based on a different energy detection (ED) clear channel assessment (CCA) level. According to one example embodiment, the systems, methods, and devices described may use an ED CCA level of −82 dBm and be able to observe an improvement of throughput, data rate and packet error rate, for example. According to another example embodiment, the device may be able to set an additional threshold at −72 dBm, for example, to sense the medium is busy. This additional threshold may be in addition to the SD and ED thresholds. Alternatively, the device may just lower the ED level from −62 dBm to −72 dBm to signal the medium is busy. FIG. 5 illustrates throughput results of an example simulation setting for a IEEE 802.11 ax network, according to one or more example embodiments. As shown in FIG. 5, adding a new threshold at −72 dBm or reducing the ED threshold to −72 dBm for identifying Wi-Fi signals increases mean throughput of the device by approximately 16%, increases $5^{th}$ percentile throughput by approximately 500%, and increases $95^{th}$ percentile throughput by over 6.5% using the example the systems, methods, and devices described.

Figure 6:
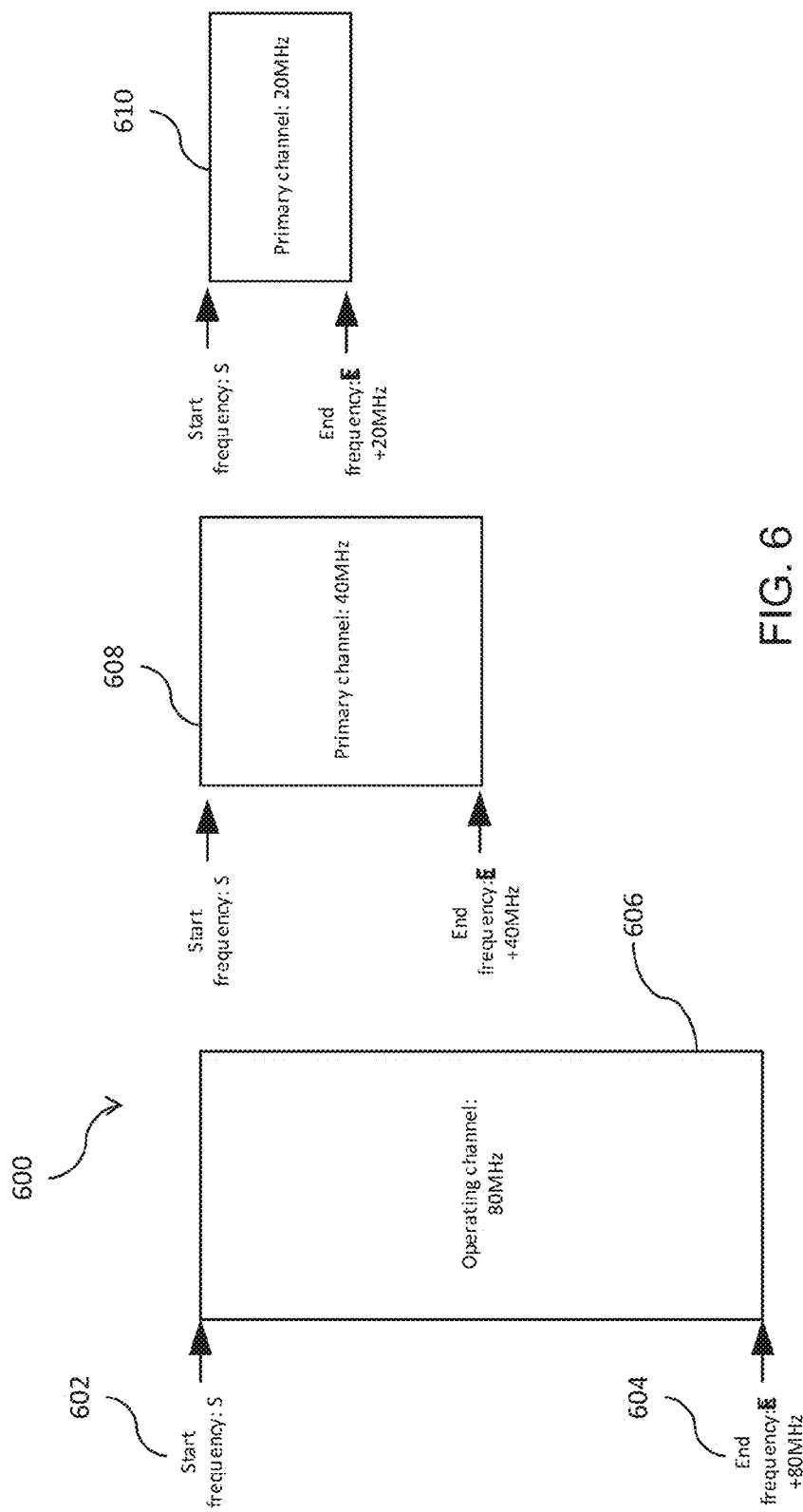
FIG. 6 illustrates frequencies and bandwidths for operation of systems and devices, according to one or more example embodiments.

FIG. 6 illustrates frequencies and bandwidths for operation of systems and devices, according to one or more example embodiments. As illustrated, the communication stations, access points, and devices described herein may operate in one or more frequencies and bandwidths. For example, in Wi-Fi network 600, devices 606, 608, and 610 may operate at different bandwidths, 80 MHz, 40 MHz, and 20 MHz, for example. Each bandwidth may have a start frequency (S) 602 and end frequency (E) 604. The bandwidth of the operation channel may be E-S. The operating channel may be 80 MHz and the primary channels may be 40 MHz and 20 MHz, respectively. We define a primary channel with bandwidth B of a Wi-Fi station as the band with starting frequency S and ending frequency S+B. In the example shown in FIG. 6, the operating bandwidth is 80 MHz, and there are two primary channels: 40 MHz primary channel and 20 Mz primary channel. However, each of the devices 606, 608, 610 can be configured to implement the methods according to one or more example embodiments described herein.

Figure 7:
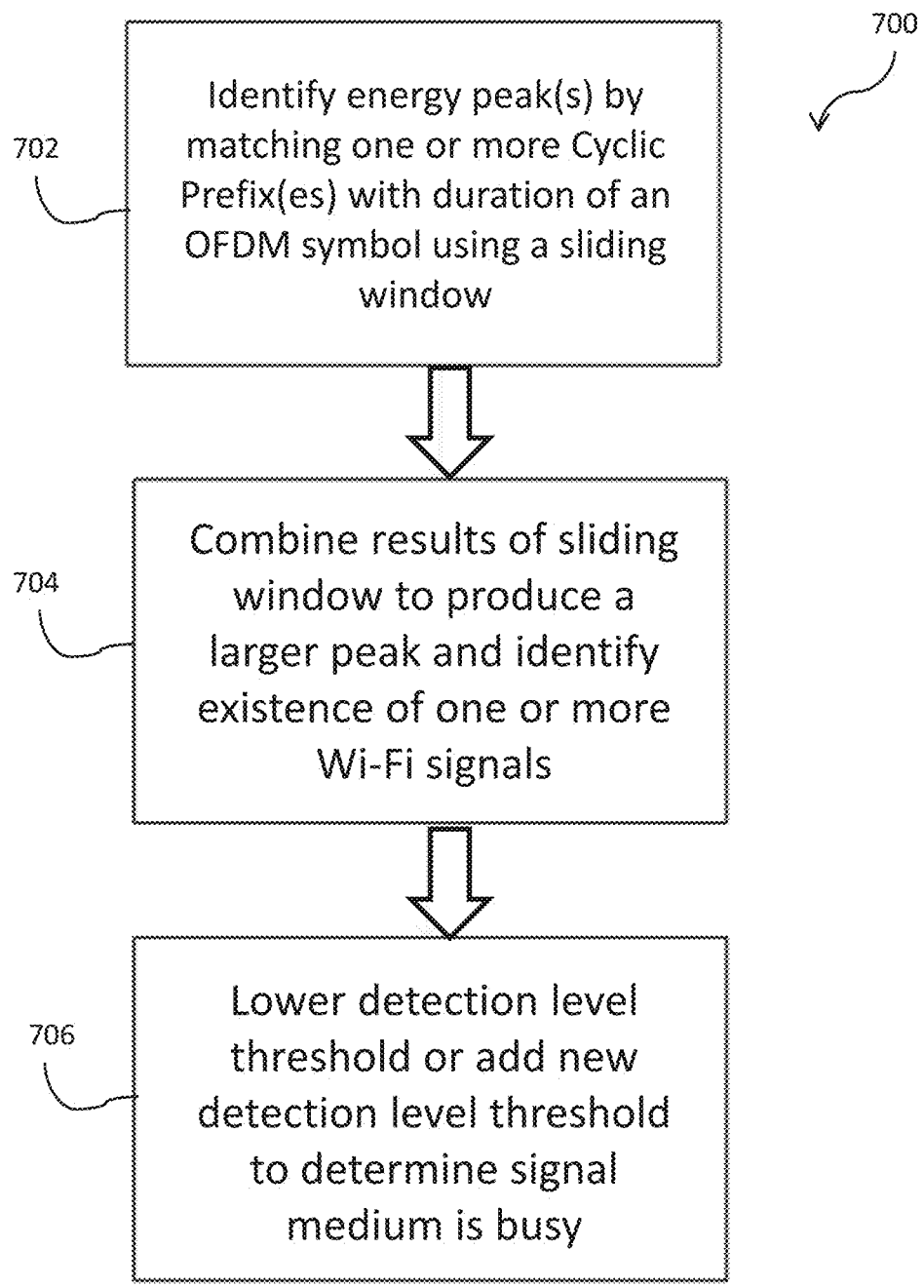
FIG. 7 illustrates example operations in a method for use in systems and devices, according to one or more example embodiments.

Turning now to FIG. 7, FIG. 7 illustrates example operations involved in an example method 700 that may be implemented on the systems and devices described with respect to the embodiment in FIG. 3, for example. At step 702, if the start time is the time that a Wi-Fi device may need to reaccess the channels, then it may use a window with length equal to the symbol duration to match an end portion with duration 'C,' for example X(t), with the beginning portion of duration 'C,' for example, X(t−T), to generate z(t)=Real(X(t)X'(t−T)). Then it may shift the window to create the z(t) at a different time point. When the window matches a symbol, there may be an energy peak.

At step 704, z(t) may be divided into durations equal to symbol duration starting from the starting time. Then the results of this symbol duration may be summed up. Accordingly, multiple energy peaks may add up to a larger peak, and the interference may cancel each other. The number 'n' may determine the number of symbol durations for z(t) that may needed to be added up. This may represent the delay to identify the existing Wi-Fi transmission, and the delay may be small. For example, if n=5 and the symbol duration is 4 µsec, then the delay is only 20 µsec. If there is a large energy peak after adding up, then the example systems, methods, and devices described may identify a Wi-Fi transmission. According to one example embodiment, the energy for the decision may be controlled by a threshold. It should be noted however that the identification of existing Wi-Fi transmission can also be combined with backoff. For example, devices can do the backoff while identifying the Wi-Fi transmissions. If the Wi-Fi transmissions are identified after backoff 2 slots, then elapse 2 slots can be added back to the backoff counter. Accordingly, there may be no delay for identifying the existing Wi-Fi transmissions if the backoff window is larger than 3, for example.

It should be noted however that even if there are more than one Wi-Fi transmissions, then there may be more than one multiple energy peaks. In this case, a device can still identify that there may be existing transmissions. It should also be noted that the Wi-Fi devices may need to continue to have these calculations so that it may know if the Wi-Fi signals have ended, and the energy is from the non-Wi-Fi signals. A condition might however exist if the energy peak of g(t) for the last 'n' simple duration is less than some threshold, then it may think there is no Wi-Fi transmissions and may use −62 dBm for ED.

Moving to step 706, if the existing Wi-Fi transmissions are identified, a Wi-Fi device can then have the following mechanisms to signal the medium is busy. According to one embodiment, the device may change the original ED threshold to a new ED threshold lower than original ED based on the design criteria. If the total energy is above the new ED threshold, then it may signal the medium is busy. Otherwise, the medium may be idle. According to another embodiment, an additional threshold may be added to signal the medium is busy. This threshold may only be used when one Wi-Fi signal is identified. After that, if the total energy is above the new threshold then it may signal the medium is busy. Otherwise, the medium may be idle. According to another embodiment, a signal medium may be busy only if there is an identified Wi-Fi packet with energy above some threshold. It should be noted that in the second option, the total energy is used to compare to the threshold. However, in the third option only the energy of one Wi-Fi signal is used to compare to the threshold. In sum, in all these three options, a threshold may be used to signal medium busy, and the threshold may be different from SD and original ED. The above example mechanisms could be applied to operating channel with any bandwidth. For example, if the Wi-Fi station operates on 20 MHz, then it can define the threshold at some level between SD for 20 MHz=−82 dBm and original ED for 20 MHz=−62 dBm. For example, if the Wi-Fi station operates on 40 MHz, then it can define the threshold at some level between SD for 40 MHz=−79 dBm and original ED for 40 MHz=−59 dBm. For example, if the Wi-Fi station operates on 80 MHz, then it can define the threshold at some level between SD for 80 MHz=−76 dBm and original ED for 80 MHz=−56 dBm. The above mechanisms can be applied to any primary channel of the operating channel of the Wi-Fi stations if the Wi-Fi stations consider the medium busy condition in any primary channel to determine medium busy in operating channel. For example, a Wi-Fi station with 80 MHz operating channel may apply our mechanism to the 20 MHz primary channel to determine if it is medium busy in 20 MHz primary channel. Then if it is medium busy in 20 MHz primary channel, then it determines that it is medium busy in 80 MHz operating channel, for example.

As it may be apparent to one skilled in the art, dBm (sometimes dBmW or Decibel-milliwatts) is an abbreviation for the power ratio in decibels (dB) of the measured power referenced to one milliwatt (mW). It is used in radio, microwave and fiber optic networks as a convenient measure of absolute power because of its capability to express both very large and very small values in a short form.

Another example embodiment is a method for identifying one or more Wi-Fi signals in a Wi-Fi network, the method comprising detecting one or more cyclic prefixes (CP) in an Orthogonal Frequency Division Multiplexing (OFDM) symbol, identifying one or more energy peaks by matching the one or more CPs with a duration of the OFDM symbol using a sliding window having a length of the duration of the OFDM symbol, identifying the one or more Wi-Fi signals using a first detection level as a first threshold, and identifying a signal medium may be busy using a second detection level as a second threshold. The first detection level may be a signal detection (SD) level. The S. Dak. level may be −82 dBm, −79 dBm, or −76 dBm. The second detection level may be lower than an energy detection (ED) level. The ED level may be −62 dBm, −59 dBm, or −56 dBm.

Figure 8:
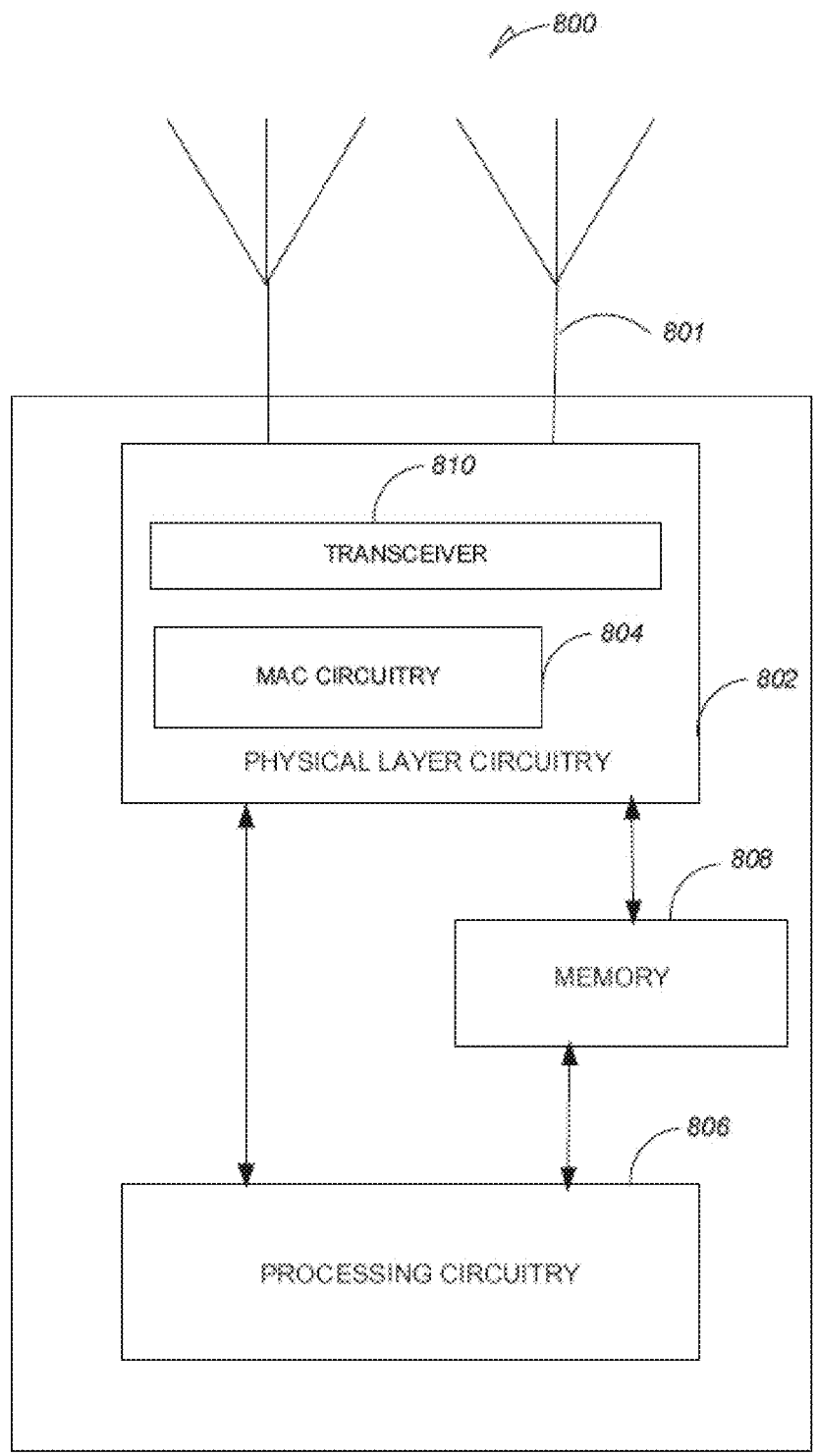
FIG. 8 illustrates a functional diagram of an example communication station or example access point, according to one or more example embodiments.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or communication station STA 104 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include physical layer circuitry 802 having a transceiver 810 for transmitting and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform operations detailed in FIGS. 1-7.

In accordance with some embodiments, the MAC circuitry 804 may be arranged to contend for a wireless medium and configure frames or packets for communicating over the wireless medium and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
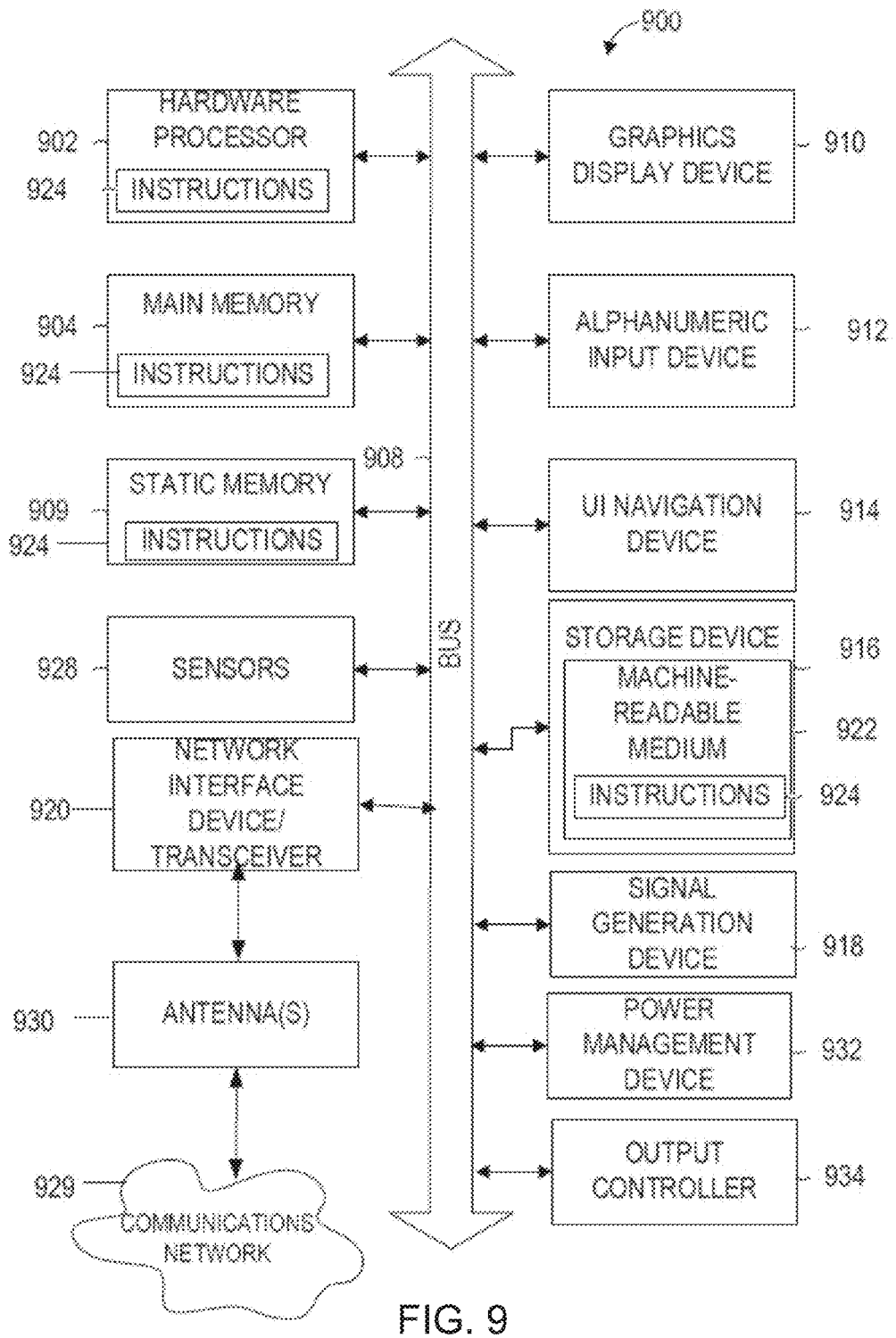
FIG. 9 shows a block diagram of an example of a machine upon which any of one or more techniques (e.g., methods) according to one or more embodiments discussed herein may be performed.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912 and UI navigation device 914 may be a touch screen display. The machine 900 may additionally include a storage device (i.e., drive unit) 916, a signal generation device 918 (e.g., a speaker), a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible media to facilitate communication of such software.

Examples

One example is a device for identifying one or more Wi-Fi signals. The device may include physical layer circuitry, one or more antennas, at least one memory, and one or more processing elements to detect one or more cyclic prefixes (CP) in an Orthogonal Frequency Division Multiplexing (OFDM) symbol, identify one or more energy peaks by matching the one or more CPs with a duration of the OFDM symbol using a sliding window having a length of the duration of the OFDM symbol, and identify the one or more Wi-Fi signals by combining the one or more energy peaks to produce a larger energy peak. The device can also be configured to identify a signal medium may be busy using a first detection level as a threshold. The first detection level may be lower than an energy detection (ED) level. The ED level may be −62 dBm, −59 dBm, or −56 dBm. The device may operate on a primary channel of 20 MHz, 40 MHz, or 80 MHz. The OFDM symbol duration may be 4 μsec or 3.6 μsec or 16 μsec, and a length of the one or more CPs may be 0.8 μsec or 0.4 μsec or 1.6 μsec.

Another example is a non-transitory computer readable storage device including instructions stored thereon, which when executed by one or more processor(s) of a communication station, cause the communication station to perform operations of detecting one or more cyclic prefixes (CP) in an Orthogonal Frequency Division Multiplexing (OFDM) symbol, identifying one or more energy peaks by matching the one or more CPs with a duration of the OFDM symbol using a sliding window having a length of the duration of the OFDM symbol, and identifying the one or more Wi-Fi signals by combining the one or more energy peaks to produce a larger energy peak. The instructions may also include the operation of identifying a signal medium may be busy using a first detection level as a threshold. The first detection level may be lower than an energy detection (ED) level. The ED level may be −62 dBm, −59 dBm, or −56 dBm. The device may operate on a primary channel of 20 MHz, 40 MHz, or 80 MHz. The OFDM symbol duration may be 4 μsec or 3.6 μsec or 16 μsec, and a length of the one or more CPs may be 0.8 μsec or 0.4 μsec or 1.6 μsec.

Another example is a method for identifying one or more Wi-Fi signals in a Wi-Fi network, the method comprising detecting one or more cyclic prefixes (CP) in an Orthogonal Frequency Division Multiplexing (OFDM) symbol, identifying one or more energy peaks by matching the one or more CPs with a duration of the OFDM symbol using a sliding window having a length of the duration of the OFDM symbol, and identifying the one or more Wi-Fi signals by combining the one or more energy peaks to produce a larger energy peak. The method may also include identifying a signal medium may be busy using a first detection level as a threshold. The first detection level may be lower than an energy detection (ED) level. The ED level may be −62 dBm, −59 dBm, or −56 dBm. The device may operate on a primary channel of 20 MHz, 40 MHz, or 80 MHz. The OFDM symbol duration may be 4 μsec or 3.6 μsec or 16 μsec, and a length of the one or more CPs may be 0.8 μsec or 0.4 μsec or 1.6 μsec.

Another example is a system including one or more wireless communication devices for identifying one or more Wi-Fi signals, the one or more wireless communication devices including physical layer circuitry, one or more antennas, at least one memory, and one or more processing elements to detect one or more cyclic prefixes (CP) in an Orthogonal Frequency Division Multiplexing (OFDM) symbol, identify one or more energy peaks by matching the one or more CPs with a duration of the OFDM symbol using a sliding window having a length of the duration of the OFDM symbol, and identify the one or more Wi-Fi signals by combining the one or more energy peaks to produce a larger energy peak. The one or more wireless communication devices may be configured to identify a signal medium is busy using a first detection level as a threshold. The first detection level may be lower than an energy detection (ED) level. The ED level can be −62 dBm, −59 dBm, or −56 dBm. The one or more wireless communication devices may operate on a primary channel of 20 MHz, 40 MHz, or 80 MHz. The OFDM symbol duration may be 4 μsec or 3.6 μsec or 16 μsec, and a length of the one or more CPs may be 0.8 μsec or 0.4 μsec or 1.6 μsec, for example.

While there have been shown, described and pointed out, fundamental novel features of the exemplary embodiments disclosed herein, it will be understood that various omissions and substitutions and changes in the form and details of devices illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A device for identifying one or more Wi-Fi signals, the device comprising:
   physical layer circuitry,
   one or more antennas,
   at least one memory, and one or more processing elements to:
  detect one or more cyclic prefixes (CP) in an Orthogonal Frequency Division Multiplexing (OFDM) symbol;
  identify one or more energy peaks by matching the one or more CPs with a duration of the OFDM symbol using a sliding window having a length of the duration of the OFDM symbol; and
  identify one or more Wi-Fi spatial reuse signals by combining the one or more energy peaks to produce a larger energy peak.

2. The device of claim 1, wherein the device identifies a signal medium is busy using a first detection level as a threshold.

3. The device of claim 2, wherein the first detection level is lower than an energy detection (ED) level.

4. The device of claim 3, wherein the ED level is −62 dBm, −59 dBm, or −56 dBm.

5. The device of claim 1, wherein the device operates on a primary channel of 20 MHz, 40 MHz, or 80 MHz.

6. The device of claim 1, wherein the OFDM symbol duration is 4 μsec or 3.6 μsec or 16 μsec, and a length of the one or more CPs is 0.8 μsec or 0.4 μsec or 1.6 μsec.

7. A non-transitory computer readable storage device including instructions stored thereon, which when executed by one or more processor(s) of a communication station, cause the communication station to perform operations of:
  detecting one or more cyclic prefixes (CP) in an Orthogonal Frequency Division Multiplexing (OFDM) symbol;
  identifying one or more energy peaks by matching the one or more CPs with a duration of the OFDM symbol using a sliding window having a length of the duration of the OFDM symbol; and
  identifying one or more Wi-Fi spatial reuse signals by combining the one or more energy peaks to produce a larger energy peak.

8. The device of claim 7, wherein the communication station identifies a signal medium is busy using a first detection level as a threshold.

9. The device of claim 8, wherein the first detection level is lower than an energy detection (ED) level.

10. The device of claim 9, wherein the ED level is −62 dBm, −59 dBm, or −56 dBm.

11. The device of claim 7, wherein the communication station operates on a primary channel of 20 MHz, 40 MHz, or 80 MHz.

12. The device of claim 7, wherein the OFDM symbol duration is 4 μsec or 3.6 μsec or 16 μsec, and a length of the one or more CPs is 0.8 μsec or 0.4 μsec or 1.6 μsec.

13. A method for identifying one or more Wi-Fi signals in a Wi-Fi network, the method comprising:
  detecting one or more cyclic prefixes (CP) in an Orthogonal Frequency Division Multiplexing (OFDM) symbol;
  identifying one or more energy peaks by matching the one or more CPs with a duration of the OFDM symbol using a sliding window having a length of the duration of the OFDM symbol; and
  identifying one or more Wi-Fi spatial reuse signals by combining the one or more energy peaks to produce a larger energy peak.

14. The method of claim 13, further comprising:
  Identifying a signal medium is busy using a first detection level as a threshold.

15. The method of claim 14, wherein the first detection level is lower than an energy detection (ED) level.

16. The method of claim 15, wherein the ED level is −62 dBm, −59 dBm, or −56 dBm.

17. The method of claim 13, wherein the OFDM symbol duration is 4 μsec or 3.6 μsec or 16 μsec, and a length of the one or more CPs is 0.8 μsec or 0.4 μsec or 1.6 μsec.

18. A system comprising:
  at least one wireless communication device for identifying one or more Wi-Fi signals, the one or more wireless communication devices comprising:
  physical layer circuitry,
  one or more antennas,
  at least one memory, and
  one or more processing elements to:
    detect one or more cyclic prefixes (CP) in an Orthogonal Frequency Division Multiplexing (OFDM) symbol;
    identify one or more energy peaks by matching the one or more CPs with a duration of the OFDM symbol using a sliding window having a length of the duration of the OFDM symbol; and
    identify the one or more Wi-Fi spatial reuse signals by combining the one or more energy peaks to produce a larger energy peak.

19. The system of claim 18, wherein the wireless communication device identifies a signal medium is busy using a first detection level as a threshold.

20. The system of claim 19, wherein the first detection level is lower than an energy detection (ED) level.

21. The system of claim 20, wherein the ED level is −62 dBm, −59 dBm, or −56 dBm.

22. The system of claim 18, wherein the wireless communication device operates on a primary channel of 20 MHz, 40 MHz, or 80 MHz.

23. The system of claim 18, wherein the OFDM symbol duration is 4 μsec or 3.6 μsec or 16 μsec, and a length of the one or more CPs is 0.8 μsec or 0.4 μsec or 1.6 μsec.

* * * * *